United States Patent [19]

Hashimoto

[11] Patent Number: 5,730,496
[45] Date of Patent: Mar. 24, 1998

[54] VEHICLE REAR SEAT DEVICE

[75] Inventor: Kazunori Hashimoto, Toyota, Japan

[73] Assignee: Toyota Jidosha Kabushiki Kaisha, Toyota, Japan

[21] Appl. No.: 764,626

[22] Filed: Dec. 11, 1996

[30] Foreign Application Priority Data

Dec. 21, 1995 [JP] Japan .................. 7-333449

[51] Int. Cl.[6] ........................................ B60N 2/00
[52] U.S. Cl. ............................... 297/335; 297/378.1
[58] Field of Search ....................... 297/334, 335, 297/331, 378.1, 378.12, 378.13, 337, 340; 296/65.1

[56] References Cited

U.S. PATENT DOCUMENTS

| | | | |
|---|---|---|---|
| 3,328,069 | 6/1967 | Dumas | 296/65.1 |
| 4,133,556 | 1/1979 | Glinski | 296/65.1 X |
| 4,376,552 | 3/1983 | Pilhall | 297/378.1 X |
| 4,512,609 | 4/1985 | Parsson | 297/331 |
| 4,637,653 | 1/1987 | Yoshida et al. | 296/65.1 X |
| 4,805,953 | 2/1989 | Yamauchi | 296/65.1 |

FOREIGN PATENT DOCUMENTS

| | | |
|---|---|---|
| 59-94933 | 6/1984 | Japan . |
| 59-94934 | 6/1984 | Japan . |
| 61-155242 | 9/1986 | Japan . |

*Primary Examiner*—Milton Nelson, Jr.
*Attorney, Agent, or Firm*—Cushman, Darby & Cushman IP Group of Pillsbury Madison & Sutro LLP

[57] ABSTRACT

A vehicle rear seat device, which enables an increase in a floor surface area of a rear portion of a vehicle, includes: a seat cushion provided so as to be rotatable approximately 180 degrees toward a front of the vehicle; a seat back which is forwardly-collapsible; and a rotating mechanism which rotates the seat cushion and at which a center of rotation of the seat cushion is set at a height which is approximately one-half of a height of the seat cushion at a front end surface of the seat cushion.

20 Claims, 5 Drawing Sheets

VEHICLE REAR SEAT DEVICE

BACKGROUND OF THE INVENTION

1. Field of the Invention

The present invention relates to a vehicle rear seat device, and in particular, to a vehicle rear seat device in which a seat cushion can be folded forward by a rotating mechanism.

2. Description of the Related Art

Japanese Utility Model Application Laid-Open (JP-U) No. 61-155242 discloses an example of a conventional seat device in which a seat cushion can be folded forward by a rotating mechanism. This structure is illustrated in FIG. 5 in which the arrow FRONT points toward the front of the vehicle.

As illustrated in FIG. 5, in this seat device, at times at which a seat 70 is not in an ordinary state of use, a seat cushion 72 of the seat 70 is rotated approximately 180 degrees toward the front of the vehicle from the position at which the seat cushion 72 is disposed when the seat 70 is in an ordinary state of use (the position illustrated by the solid line), so that the seat cushion 72 is, as illustrated by the two-dot chain line, accommodated in a seat cushion accommodating recess 76 formed in a floor 74. Further, a seat back 78 of the seat 70 is rotated toward the front of the vehicle from the position at which the seat back 78 is disposed when the seat 70 is in an ordinary state of use (the position illustrated by the solid line), so as to be accommodated in a seat back accommodating recess 80 formed in the floor 74 as illustrated by the two-dot chain line. In this way, a substantially flat floor surface 74A is formed at the rear portion of the vehicle.

As illustrated in FIG. 5, when the seat 70 is to be set in the ordinary state of use, the seat cushion 72 in the state illustrated by the two-dot chain line is pulled out from the seat cushion accommodating recess 76 and rotated approximately 180 degrees toward the rear of the vehicle so as to be set in the state illustrated by the solid line. Further, the seat back 78 in the state illustrated by the two-dot chain line is pulled out from the seat back accommodating recess 80 and set upright in the state illustrated by the solid line. In this way, the seat 70 is disposed on the floor 74.

However, in such a vehicle rear seat device, in the state in which the seat cushion 72 is rotated approximately 180 degrees toward the front of the vehicle and accommodated in the seat cushion accommodating recess 76 formed in the floor 74 (i.e., in the state illustrated by the two-dot chain line in FIG. 5), a rotating mechanism 82 for rotating the seat cushion 72 may project from the substantially flat floor surface 74A. Accordingly, when the substantially flat floor surface 74A is used as a bed or the like when the vehicle is stopped, the rotating mechanism 82 may cause an unpleasant sensation.

SUMMARY OF THE INVENTION

In view of the aforementioned, an object of the present invention is to provide a vehicle rear seat device in which a rotating mechanism does not project from a flat surface even in cases in which a seat cushion is rotated approximately 180 degrees toward the front of the vehicle from the position at which the seat cushion is disposed when the seat is in an ordinary state of use.

A first aspect of the present invention is a vehicle rear seat device enabling an increase in a floor surface area of a rear portion of a vehicle, comprising: a seat cushion provided so as to be rotatable approximately 180 degrees toward a front of the vehicle; a seat back which is forwardly-collapsible; and a rotating mechanism which rotates the seat cushion and at which a center of rotation of the seat cushion is set at a height which is approximately one-half of a height of the seat cushion at a front end surface of the seat cushion.

Accordingly, even if the seat cushion is rotated approximately 180 degrees toward the front of the vehicle by the rotating mechanism, the rotating mechanism does not project from the flat surface.

A second aspect of the present invention is a vehicle rear seat device in which, in the vehicle rear seat device of the first aspect, at the rotating mechanism, the center of rotation of the seat cushion is set at a height which is approximately one-half of a thickness dimension of the seat back which has been collapsed forward.

Accordingly, when the seat cushion is rotated approximately 180 degrees toward the front of the vehicle by the rotating mechanism and the seat back is collapsed forward, a flat surface which is flush from the reverse surface of the seat cushion to the reverse surface of the seat back is obtained. ("Reverse surface of the seat cushion" refers to the surface of the seat cushion which opposes the floor surface when the seat is in the ordinary state of use. "Reverse surface of the seat back" refers to the surface of the seat back which faces toward the rear of the vehicle when the seat is in the ordinary state of use.)

A third aspect of the present invention is a vehicle rear seat device in which, in the vehicle rear seat device of the first aspect, the seat cushion has a seat cushion lower portion which is disposed in a floor recess portion formed in a floor surface provided at a rear of the vehicle, and a seat cushion upper portion which is rotatable toward the front of the vehicle, the floor surface being a border between the seat cushion lower portion and the seat cushion upper portion.

Therefore, in a case in which the seat is in an ordinary state of use, the seat cushion upper portion is superposed on the seat cushion lower portion, and the seating comfort of the rear seat in the ordinary state of use does not deteriorate. When the seat cushion upper portion is rotated approximately 180 degrees toward the front of the vehicle, the flat surface provided at the reverse surface of the seat cushion upper portion is exposed.

A fourth aspect of the present invention is a vehicle rear seat device in which, in the third aspect, the rotating mechanism has an upper plate which is mounted to a front portion of a seat frame provided at the seat cushion upper portion, a lower plate which is mounted to the floor surface, and a hinge shaft which connects the upper plate and the lower plate, and the seat cushion upper portion has a top plate, and a rear end of the top plate is fixed to a rear portion of the seat frame, and a front end of the top plate is allowed to bend toward a bottom of the vehicle when a vehicle passenger is seated, and the front end of the top plate is connected to the lower plate via a connecting member such that bending of the front end of the top plate toward the bottom of the vehicle when the seat cushion is in a folded-forward state is restricted.

Accordingly, downward bending of the top plate when a vehicle passenger is seated is permitted, and the downward bending of the top plate when the seat cushion is in the folded-forward state can be restricted. Therefore, an excellent effect is achieved in that the top plate can withstand local loads such as pressure from a person's hand or the like.

DESCRIPTION OF THE PREFERRED EMBODIMENTS

An embodiment of a vehicle rear seat device of the present invention will be described hereinafter in accordance with FIGS. 1 through 4.

In the figures, the arrow FR points toward the front of the vehicle, whereas the arrow UP points toward the top of the vehicle.

Figure 4:
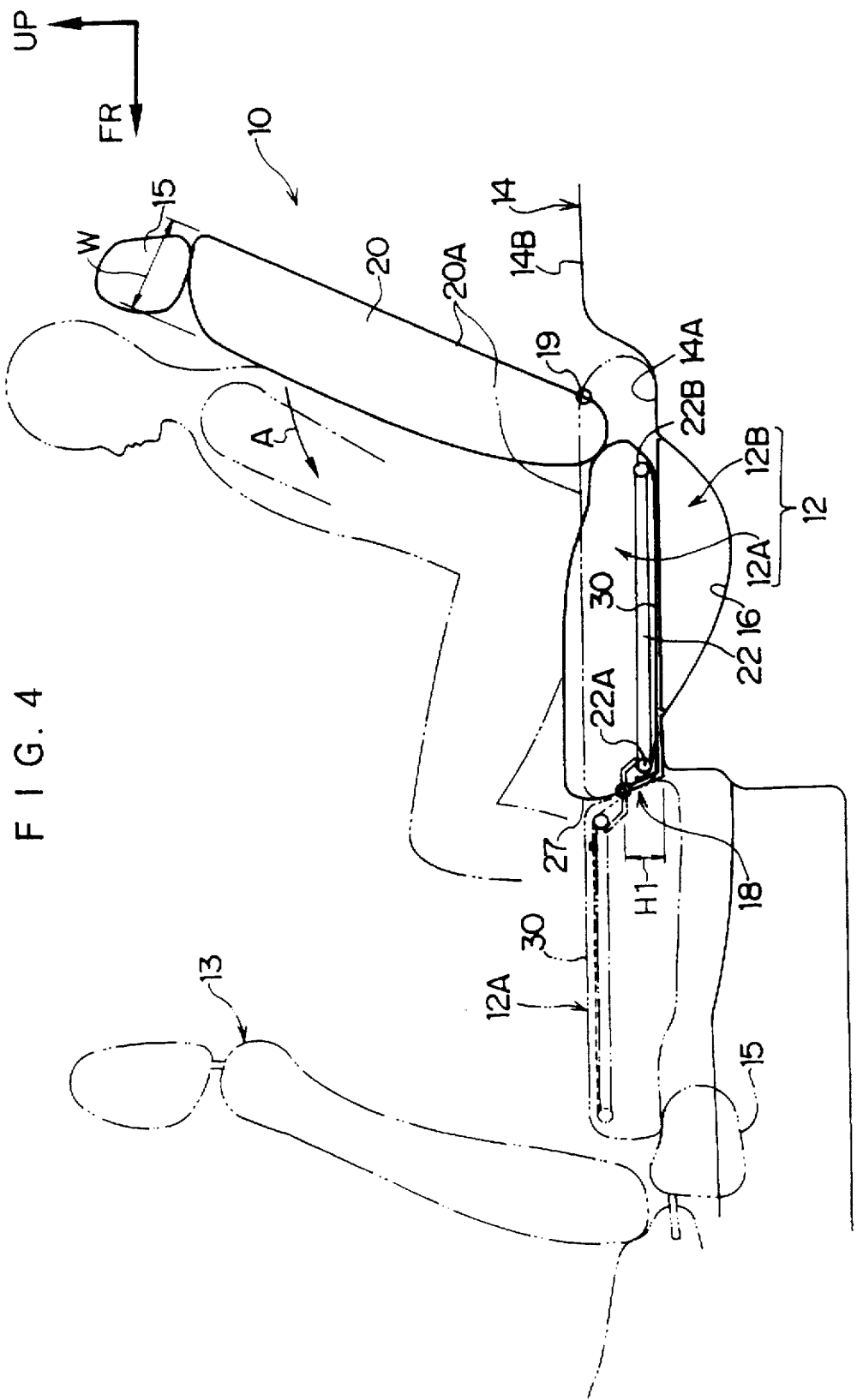
FIG. 4 is a schematic side illustrating main portions of the vehicle rear seat device relating to the embodiment of the present invention.
Figure 5:
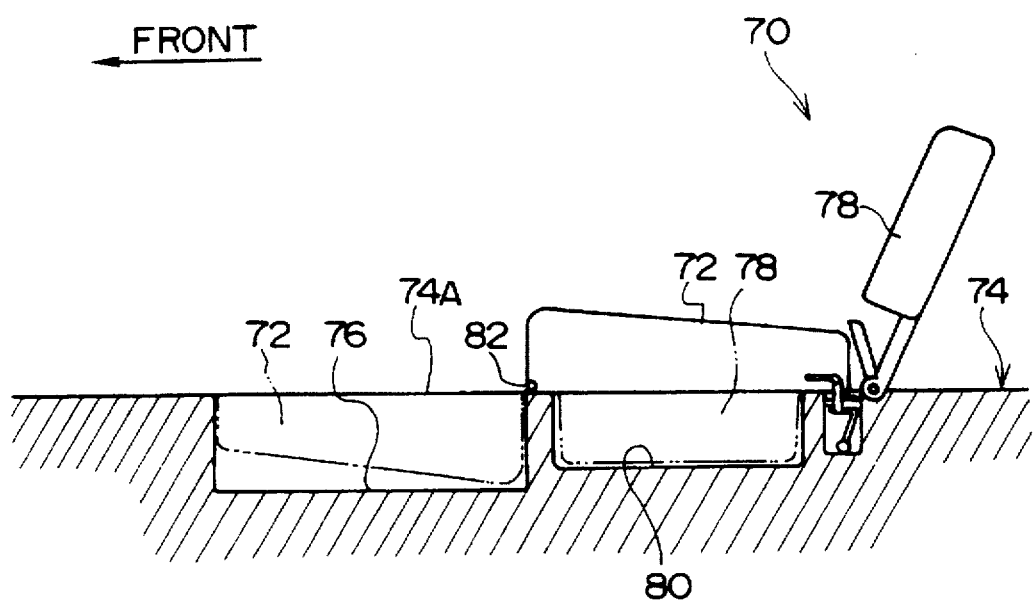
FIG. 5 is a schematic side sectional view illustrating a vehicle rear seat device relating to a conventional embodiment.

As illustrated in FIG. 4, rear seat cushions 12 of left and right side rear seats 10 of the present embodiment are disposed at a floor surface 14A which is a rearward, high portion of a stepped floor 14 of a vehicle. The rear seat cushion 12 is formed by a rear seat cushion main body portion 12A, which is a seat cushion upper portion disposed above the floor surface 14A, and a rear seat cushion divisional portion 12B, which is a seat cushion lower portion disposed beneath the floor surface 14A.

The rear seat cushion main body portion 12A is mounted to the front end portion of the floor surface 14A via rotating mechanisms 18. Due to the rotating mechanisms 18, the rear seat cushion main body portion 12A can be moved to the folded-forward position illustrated by the two-dot chain line in FIG. 4 in which the rear seat cushion main body portion 12A has been rotated approximately 180 degrees toward the front of the vehicle from the position illustrated by the solid line. In this folded-forward state, the rear seat cushion main body portion 12A is supported by, for example, a headrest 15 of the rear seat 10 which is inserted into a headrest stay insertion guide portion provided at the lower portion of a front seat 13 (i.e., at the seat cushion of the front seat 13).

The rear seat cushion divisional portion 12B remains within a floor recess 16 formed in the floor surface 14A.

When the seat is in an ordinary state of use, a rear seat back 20 is provided at the rear portion of the rear seat cushion main body portion 12A. The rear seat back 20 is mounted so as to be swingable toward the front of the vehicle (i.e., in the direction of arrow A in FIG. 1) by a hinge shaft 19 provided at the vehicle body. As a result, when the rear seat back 20 is collapsed forward to the state illustrated by the imaginary line in FIG. 4, a reverse surface 20A of the rear seat back 20 becomes substantially flush with a vehicle rear side floor surface 14B which is formed at the vehicle rear side of the floor surface 14A and which is higher than the floor surface 14A. Therefore, a flat floor surface can be provided.

Figure 2:
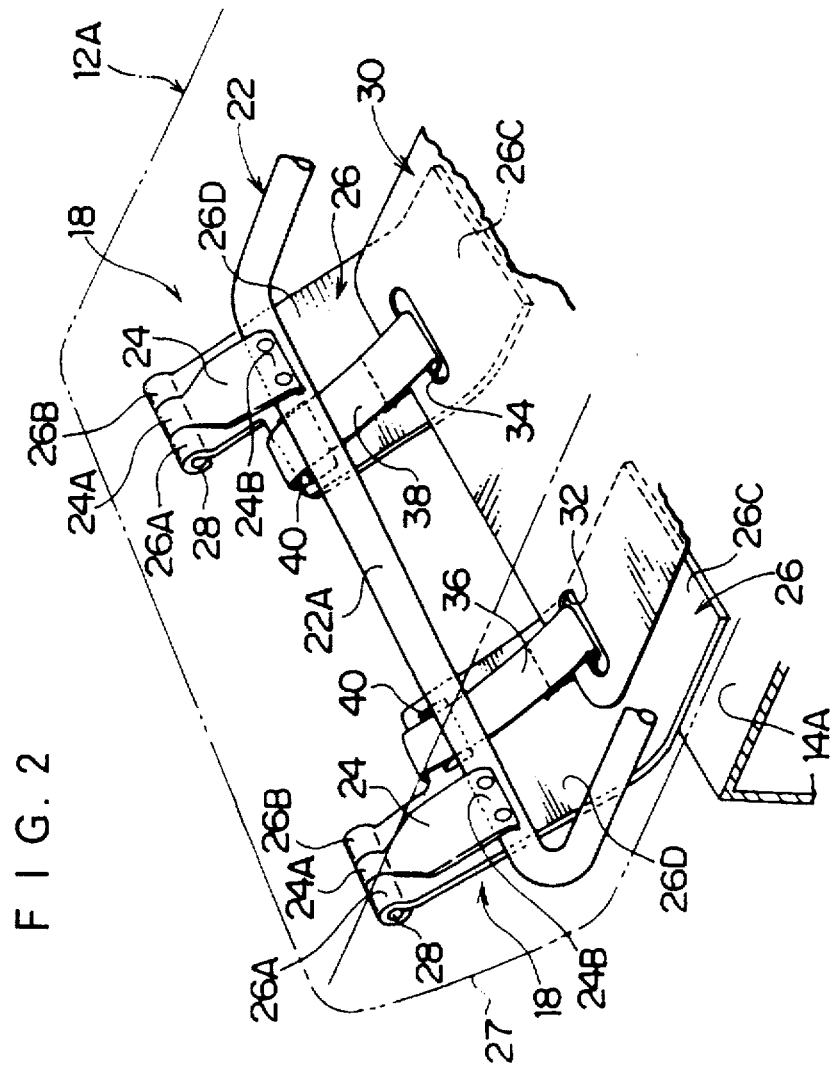
FIG. 2 is a perspective view, as seen from the front of the vehicle and at a diagonal, of an ordinary state of use of the vehicle rear seat device relating to the embodiment of the present invention.

As illustrated in FIG. 2, a pair of the rotating mechanisms 18 is provided at each rear seat, one at the left side of the rear seat and one at the right side. Each rotating mechanism 18 is formed by an upper plate 24, a lower plate 26, and a hinge shaft 28. The upper plate 24 is mounted to a front portion 22A of a seat frame 22 of the rear seat cushion main body portion 12A. The lower plate 26 is mounted to the floor surface 14A. The hinge shaft 28 connects a front end portion 24A of the upper plate 24 and front end portions 26A, 26B of the lower plate 26.

A base portion 26C of the lower plate 26 is fixed by welding or the like to the floor surface 14A. From the front end portion of the base portion 26C of the lower plate 26, an extending portion 26D extends along a front end surface 27 of the rear seat cushion main body portion 12A upwardly at an incline toward the front of the vehicle. The front end portions 26A, 26B are formed at the distal end of the extending portion 26D. The front end portions 26A, 26B are formed as cylinders which oppose each other with a predetermined interval therebetween and whose axis runs along the vehicle transverse direction.

Figure 1:
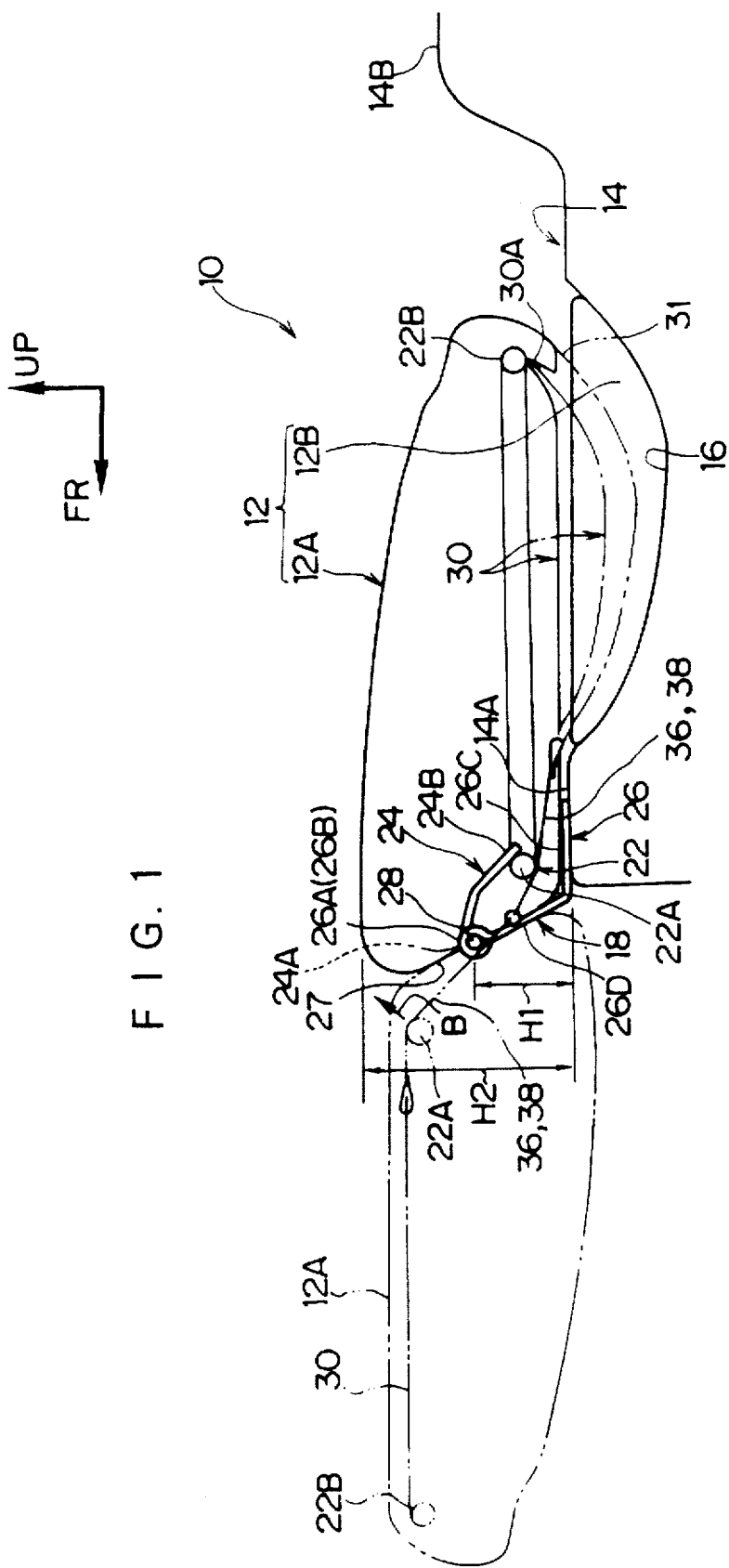
FIG. 1 is a schematic side view illustrating main portions of a vehicle rear seat device relating to an embodiment of the present invention.

As illustrated in FIG. 1, the extending portion 26D is set such that a height H1 of the axis of the front end portions 26A, 26B is substantially half of a height H2 of the rear seat cushion main body portion 12A at the front end surface 27 thereof.

As shown in FIG. 2, a rear end portion vicinity 24B of the upper plate 24 is fixed by welding or the like to the front portion 22A of the seat frame 22. The upper plate 24 extends from the rear end portion vicinity 24B upward at an incline toward the front of the vehicle, and the cylindrical front end portion 24A is formed at the distal end portion thereof. The axis of the front end portion 24A runs along the transverse direction of the vehicle. The front end portion 24A is inserted between the front end portions 26A, 26B of the lower plate 26, and the hinge shaft 28 is inserted through the front end portion 24A and the front end portions 26A, 26B.

Accordingly, the rear seat cushion main body portion 12A can be moved to the folded-forward position illustrated by the two-dot chain line in FIG. 1 by rotating the rear seat cushion main body portion 12A by approximately 180 degrees toward the front of the vehicle around the hinge shafts 28 which are set at positions at a height which is substantially half of the height H2 of the rear seat cushion main body portion 12A at the front end surface 27 thereof. As a result, when the rear seat cushion main body portion 12A is rotated approximately 180 degrees toward the front of the vehicle, the rotating mechanisms 18 do not project from the reverse surface of the rear seat cushion main body portion 12A (i.e., the surface of the rear seat cushion main body portion 12A which opposes the floor surface 14A and the rear seat cushion divisional portion 12B when the rear seat 10 is in the ordinary state of use).

As illustrated in FIG. 4, the height H1 of the center of rotation of the rear seat cushion main body portion 12A (i.e., the height of the axis of the front end portions 26A, 26B) is set to substantially half of the thickness dimension W of the upper end surface of the rear seat back 20 which has been collapsed forward (H1+W/2). As a result, when the rear seat cushion main body portion 12A is rotated approximately 180 degrees toward the front of the vehicle by the rotating mechanisms 18 and the rear seat back 20 is collapsed forward, a flat surface which is flush from the reverse surface of the rear seat cushion main body portion 12A to the reverse surface 20A of the rear seat back 20 can be ensured.

As illustrated in FIG. 1, a top plate 30 having plasticity is disposed at the bottom portion of the rear seat cushion main body portion 12A. The top plate 30 is rectangular, and a rear end portion 30A thereof is mounted to a rear portion 22B of the seat frame 22.

As illustrated in FIG. 2, elongated holes 32, 34 which extend in the transverse direction of the vehicle are formed at the left and right sides of a vicinity of the front end portion of the top plate 30. Ones of end portions of webbings 36, 38, which serve as connecting members, are connected to the elongated holes 32, 34, respectively. The other end portions of the webbings 36, 38 are connected to elongated holes 40 which extend in the transverse direction of the vehicle and are formed in the extending portions 26D of the lower plates 26.

The elongated holes 40 are formed at positions which are slightly beneath the hinge shafts 28, i.e., positions which are slightly lower than the height H1 which is substantially half of the height H2 of the rear seat cushion main body portion 12A. The webbings 36, 38 are disposed at the seat outer side of the seat frame 22. For example, when the rear seat cushion main body portion 12A is in an ordinary state of use (the state illustrated in FIG. 2 and by the solid line in FIG. 1), the webbings 36, 38 pass beneath the front portion 22A of the seat frame 22.

Accordingly, when the rear seat cushion main body portion 12A is in an ordinary state of use, the top plate 30 can bend downward, as illustrated by the one-dot chain line in FIG. 1, together with the rear seat cushion main body portion 12A in accordance with the body type and the weight of the passenger seated on the seat. At this time, a seat surface covering 31 also bends downward as illustrated by the two-dot chain line in FIG. 1.

Figure 3:
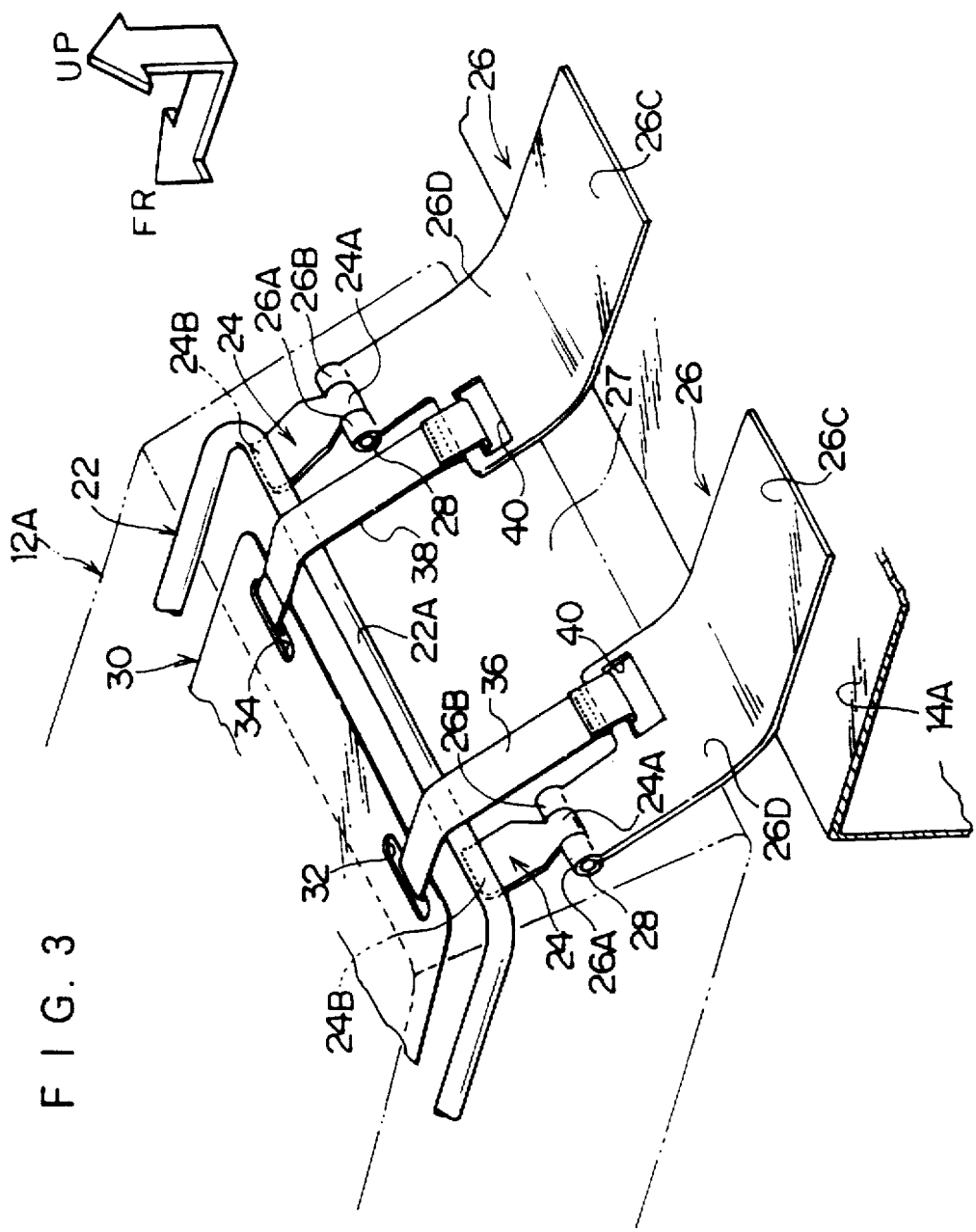
FIG. 3 is a perspective view, as seen from the rear of the vehicle and at a diagonal, of a state in which the vehicle rear seat device relating to the embodiment of the present invention is rotated approximately 180 degrees toward the front of the vehicle.

As shown in FIG. 3, the elongated holes 40 of the lower plates 26 are set at positions slightly lower than the hinge shafts 28. Therefore, when the rear seat cushion main body portion 12A is moved to the folded-forward position at which the rear seat cushion main body portion 12A is rotated approximately 180 degrees toward the front of the vehicle around the hinge shafts 28, the distance between, on the one hand, the elongated holes 32, 34 of the top plate 30 and, on the other hand, the elongated holes 40 of the lower plates 26 is longer than when the rear seat cushion main body portion 12A is in the ordinary state of use (the state illustrated in FIG. 2). Further, the intermediate portions of the webbings 36, 38 are pushed substantially upward and rearward (i.e., in the direction of arrow B in FIG. 1) by the front portion 22A of the seat frame 22. As a result, tension is generated in the webbings 36, 38. The length of the webbings 36, 38 is set to a length at which, due to this tension, the upper plate 30 forms a flat, difficult-to-bend surface which can withstand local loads such pressure from a person's hand or the like. Further, the top plate 30 is not fixed to the seat frame 20 in the vehicle transverse direction.

Next, operation of the present embodiment will be described. In the vehicle rear seat device of the present embodiment, the rear seat cushion main body portion 12A is rotated approximately 180 degrees toward the front of the vehicle around the hinge shafts 28 of the rotating mechanisms 18 which are set in a vicinity of the center of the height H2 of the rear seat cushion main body portion 12A at the front end surface 27 thereof. In this way, the rear seat cushion main body portion 12A can be moved to the folded-forward position illustrated by the two-dot chain line in FIG. 1. As a result, in a case in which the rear seat back 20 and the rear seat cushion main body portion 12A are made flat, as illustrated by FIG. 4, the rotating mechanisms 18 do not project from the reverse surface of the rear seat cushion main body portion 12A because vicinities of the hinge shafts 28 of the rotating mechanisms 18 are interposed, without any gaps, between the rear seat back 20 and the rear seat cushion main body portion 12A which have been made flat. Accordingly, when the vehicle is stopped, even if the rear seat back 20 and the rear seat cushion main body portion 12A which have been made flat are used as a bed or the like, the rotating mechanisms 18 hardly cause any unpleasant sensations.

In the vehicle rear seat device of the present embodiment, as illustrated in FIG. 4, the height H1 of the center of rotation of the rear seat cushion main body portion 12A is set to be approximately half of the thickness dimension W of the rear seat back 20 which has been collapsed forward (H+W/2). Therefore, when the rear seat cushion main body portion 12A is rotated approximately 180 degrees toward the front of the vehicle by the rotating mechanisms 18 and the rear seat back 20 is collapsed forward, a flat surface which is flush from the reverse surface of the rear seat cushion main body portion 12A to the reverse surface 20A of the rear seat back 20 can be ensured.

In the vehicle rear seat device of the present embodiment, when the rear seat cushion main body portion 12A is in an ordinary state of use (i.e., the state illustrated by the solid line in FIG. 1), the top plate 30, together with the rear seat cushion main body portion 12A, bends downwardly as shown by the one-dot chain line in FIG. 1 in accordance with the body type and the weight of the passenger seated on the seat. As a result, the seating comfort of the seat does not deteriorate.

When the rear seat cushion main body portion 12A is rotated around the hinge shafts 28 substantially 180 degrees toward the front of the vehicle and moved to the folded-forward position illustrated in FIG. 3, the distance between, on the one hand, the elongated holes 32, 34 of the top plate 30, and on the other hand, the elongated holes 40 of the lower plates 26, is longer than in a case in which the rear seat cushion main body portion 12A is in the ordinary state of use as illustrated in FIG. 2. Further, intermediate portions of the webbings 36, 38 are pushed substantially upwardly and rearwardly (in the direction of arrow B in FIG. 1) by the front portion 22A of the seat frame 22. As a result, tension is generated in the webbings 36, 38, and the downward bending of the top plate 30 is restricted. Accordingly, the top plate 30 of the rear seat cushion main body portion 12A which is at the folded-forward position can withstand local loads of an extent such as pressure from a person's hand or the like.

Further, in the vehicle rear seat device of the present embodiment, when the seat is in the ordinary state of use, the rear seat cushion main body portion 12A is superposed on the rear seat cushion divisional portion 12B, and the seating comfort of the rear seat 10 does not deteriorate. When the rear seat cushion main body portion 12A is at the folded-forward position, the rear seat cushion divisional portion 12B remains in the floor recess 16 formed in the floor surface 14A, and the reverse surface of the rear seat cushion main body portion 12A forms a flat surface.

A specific embodiment of the present invention has been described in detail herein. However, it should be clear to persons skilled in the art that the present invention is not limited to this embodiment, and a variety of embodiments are possible within the scope of the present claims. For example, the webbings 36, 38 are used as the connecting members in the vehicle rear seat device of the present embodiment. However, the connecting members are not limited to webbings, and other members such as wires, rubber belts or the like may be used.

What is claimed is:

1. A vehicle rear seat device enabling an increase in a floor surface area of a rear portion of a vehicle, comprising:

a seat cushion provided so as to be rotatable approximately 180 degrees toward a front of the vehicle;

a seat back which is forwardly-collapsible; and a rotating mechanism which rotates said seat cushion and in which a center of rotation of said seat cushion is set at a height which is substantially one-half of a height of a front end surface of said seat cushion, wherein said center of rotation is located on said front end surface of said seat cushion.

2. A vehicle rear seat device according to claim 1, wherein at said rotating mechanism, the center of rotation of said seat cushion is set at a height which is approximately one-half of a thickness dimension of said seat back which has been collapsed forward.

3. A vehicle rear seat device according to claim 1, wherein said seat cushion has a seat cushion lower portion which is adapted to be disposed in a floor recess portion formed in a floor surface provided at a rear of the vehicle, and a seat cushion upper portion which is rotatable toward the front of the vehicle, the floor surface being a border between said seat cushion lower portion and said seat cushion upper portion.

4. A vehicle rear seat device according to claim 3, wherein said rotating mechanism has an upper plate which is mounted to a front portion of a seat frame provided at said seat cushion upper portion, a lower plate which is adapted to be mounted to the floor surface, and a hinge shaft which connects said upper plate and said lower plate.

5. A vehicle rear seat device according to claim 4, wherein said seat cushion upper portion has a top plate, and a rear end of said top plate is fixed to a rear portion of the seat frame, and a front end of said top plate is allowed to bend toward a bottom of the vehicle when a vehicle passenger is seated, and the front end of said top plate is connected to said lower plate via a connecting member such that bending of the front end of said top plate toward the bottom of the vehicle when said seat cushion is in a folded-forward state is restricted.

6. A vehicle rear seat device according to claim 5, wherein said connecting member is provided beneath a front portion of the seat frame when a vehicle passenger is seated.

7. A vehicle rear seat device according to claim 5, wherein when said seat cushion is in a folded-forward state, a substantially intermediate portion of said connecting member is pushed by the front portion of the seat frame such that tension is applied to said connecting member.

8. A vehicle rear seat device according to claim 5, wherein said connecting member is an elongated member.

9. A vehicle rear seat device enabling an increase in a floor surface area of a rear portion of a vehicle, comprising:

a seat cushion provided so as to be rotatable approximately 180 degrees toward a front of the vehicle;

a seat back which is forwardly-collapsible; and a rotating mechanism which rotates said seat cushion and in which a center of rotation of said seat cushion is set at a height which is substantially one-half of a height of a front end surface of said seat cushion and which is substantially one-half of a thickness dimension of said seat back which has been collapsed forward.

10. A vehicle rear seat device according to claim 9, wherein said seat cushion has a seat cushion lower portion which is adapted to be disposed in a floor recess portion formed in a floor surface provided at a rear of the vehicle, and a seat cushion upper portion which is rotatable toward the front of the vehicle, the floor surface being a border between said seat cushion lower portion and said seat cushion upper portion.

11. A vehicle rear seat device according to claim 10, wherein said rotating mechanism has an upper plate which is mounted to a front portion of a seat frame provided at said seat cushion upper portion, a lower plate which is adapted to be mounted to the floor surface, and a hinge shaft which connects said upper plate and said lower plate, and said seat cushion upper portion has a top plate, and a rear end of said top plate is fixed to a rear portion of the seat frame, and a front end of said top plate is allowed to bend toward a bottom of the vehicle when a vehicle passenger is seated, and the front end of said top plate is connected to said lower plate via a connecting member such that bending of the front end of said top plate toward the bottom of the vehicle when said seat cushion is in a folded-forward state is restricted.

12. A vehicle rear seat device according to claim 11, wherein said connecting member is provided beneath a front portion of the seat frame when a vehicle passenger is seated.

13. A vehicle rear seat device according to claim 11, wherein when said seat cushion is in a folded-forward state, a substantially intermediate portion of said connecting member is pushed by the front portion of the seat frame such that tension is applied to said connecting member.

14. A vehicle rear seat device according to claim 11, wherein said connecting member is an elongated member.

15. A vehicle rear seat device enabling an increase in a floor surface area of a rear portion of a vehicle, comprising:

a seat cushion provided so as to be rotatable approximately 180 degrees toward a front of the vehicle, said seat cushion having a seat cushion lower portion, which is adapted to be disposed in a floor recess portion formed in a floor surface provided at a rear of the vehicle, and a seat cushion upper portion, which is rotatable toward the front of the vehicle, the floor surface being a border between said seat cushion lower portion and said seat cushion upper portion;

a seat back which is forwardly-collapsible; and a rotating mechanism which rotates said seat cushion and in which a center of rotation of said seat cushion is set at a height which is substantially one-half of a height of a front end surface of said seat cushion and which is substantially one-half of a thickness dimension of said seat back which has been collapsed forward.

16. A rear seat vehicle device according to claim 15, wherein said rotating mechanism has an upper plate which is mounted to a front portion of a seat frame provided at said seat cushion upper portion, a lower plate which is adapted to be mounted to the floor surface, and a hinge shaft which connects said upper plate and said lower plate, and said seat cushion upper portion has a top plate, and a rear end of said top plate is fixed to a rear portion of the seat frame, and a front end of said top plate is allowed to bend toward a bottom of the vehicle when a vehicle passenger is seated, and the front end of said top plate is connected to said lower plate via a connecting member such that bending of the front end of said top plate toward the bottom of the vehicle when said seat cushion is in a folded-forward state is restricted.

17. A rear seat vehicle device according to claim 16, wherein said connecting member is provided beneath a front portion of the seat frame when a vehicle passenger is seated.

18. A rear seat vehicle device according to claim 17, wherein said connecting member is an elongated member.

19. A rear seat vehicle device according to claim 16, wherein when said seat cushion is in a folded-forward state, a substantially intermediate portion of said connecting member is pushed by the front portion of the seat frame such that tension is applied to said connecting member.

20. A rear seat vehicle device according to claim 19, wherein said connecting member is an elongated member.

* * * * *